(12) United States Patent
Kumar et al.

(10) Patent No.: US 9,367,579 B1
(45) Date of Patent: Jun. 14, 2016

(54) SYSTEM AND METHOD FOR MAINTAINING A FILE CHANGE LOG WITHIN A DISTRIBUTED FILE SYSTEM

(75) Inventors: Nookala Sunder Phani Kumar, Pune (IN); Joseph Michael Maionchi, Vallejo, CA (US); Edwin F. Menze, III, Lake Oswego, OR (US); Dheer Moghe, Sunnyvale, CA (US); Anurag Agarwal, Sunnyvale, CA (US); Jobi Ariyamannil, San Jose, CA (US); Craig Keatley Harmer, San Francisco, CA (US)

(73) Assignee: Veritas Technologies LLC, Mountain View, CA (US)

( * ) Notice: Subject to any disclaimer, the term of this patent is extended or adjusted under 35 U.S.C. 154(b) by 1599 days.

(21) Appl. No.: 11/064,152

(22) Filed: Feb. 23, 2005

(51) Int. Cl.
*G06F 17/30* (2006.01)

(52) U.S. Cl.
CPC .................................. *G06F 17/30371* (2013.01)

(58) Field of Classification Search
USPC .................................................. 707/703, 704
See application file for complete search history.

(56) References Cited

U.S. PATENT DOCUMENTS

| | | | |
|---|---|---|---|
| 5,588,147 A * | 12/1996 | Neeman et al. | 707/1 |
| 6,189,016 B1 | 2/2001 | Cabrera et al. | 707/203 |
| 6,192,365 B1 * | 2/2001 | Draper et al. | 707/101 |
| 6,397,351 B1 * | 5/2002 | Miller et al. | 714/13 |
| 6,725,392 B1 * | 4/2004 | Frey et al. | 714/6 |
| 7,086,063 B1 * | 8/2006 | Ousterhout et al. | 718/106 |
| 7,472,178 B2 * | 12/2008 | Lisiecki et al. | 709/223 |
| 7,512,636 B2 * | 3/2009 | Verma et al. | 707/200 |
| 7,539,976 B1 * | 5/2009 | Ousterhout et al. | 717/120 |
| 7,890,469 B1 * | 2/2011 | Maionchi et al. | 707/654 |
| 2001/0052024 A1 * | 12/2001 | Devarakonda et al. | 709/238 |
| 2002/0144252 A1 * | 10/2002 | Straube et al. | 717/168 |
| 2005/0181789 A1 * | 8/2005 | Yach et al. | 455/433 |

* cited by examiner

*Primary Examiner* — Fred I Ehichioya
*Assistant Examiner* — Johnese Johnson
(74) *Attorney, Agent, or Firm* — Campbell Stephenson LLP (57) ABSTRACT

Various methods and systems for implementing a file change log in a distributed file system are disclosed. In one embodiment, a method involves operating a distributed file system that presents a namespace and maintaining a file change log for the namespace. Operating the distributed file system involves executing an instance of a file system on each of several nodes. Maintaining the file change log can involve maintaining a single file change log for the namespace. Updates to the single file change log can be handled by a primary node or controlled using a locking mechanism. Alternatively, several private file change logs (e.g., one per node) can be maintained, and these private file change logs can be merged into a single file change log (e.g., by a primary node).

28 Claims, 8 Drawing Sheets

FIG. 4:
Asymmetric File
System Cluster

FIG. 5

FIG. 6:
Symmetric File
System Cluster

_SYSTEM AND METHOD FOR MAINTAINING A FILE CHANGE LOG WITHIN A DISTRIBUTED FILE SYSTEM_

FIELD OF THE INVENTION

This invention relates to file systems and, more particularly, to distributed file systems in which multiple nodes cooperate to present a unified namespace.

BACKGROUND OF THE INVENTION

A file system takes ownership of the storage space of a volume or hard disk and uses the storage space to store files, directories, and other file system objects. An application can access file system objects by making a system call through the operating system of the computing device on which the file system resides. Most file systems support a standard set of system calls, such as open, read, and write, that can be used to perform operations on a file.

A file system maintains at least one namespace for file system objects. A namespace is a set or group of names that is defined according to some naming convention. A flat namespace uses a single, unique name for every file system object. For example, a small Windows (NetBIOS) network requires a different name to be assigned to each computer and printer which appear as files in a flat namespace. File system objects within the namespace can be accessed by applications.

In order to provide increased bandwidth when accessing files within the name space and/or to provide increased file system availability, a file system can be implemented on multiple independent computing devices, called nodes, that cooperate to provide a unified namespace. An arrangement of multiple nodes, each of which executes an instance of the file system, that cooperate to provide a unified namespace is referred to herein as a distributed file system. A common example of such a distributed file system is a clustered file system. In a clustered file system, software on each node controls the behavior of each node such that, from the perspective of a client, all of the nodes within the cluster appear to be a single entity.

Many techniques that can be used within non-distributed file systems will not work properly within a distributed file system. For example, a file system can maintain a file change log in order to track which files within the namespace have changed during a given interval. If each node within a distributed file system attempts to maintain a file change log according to techniques developed for non-distributed file systems, the resulting file change logs may not be useable, since there is no way to order entries created on each different node relative to each other. Accordingly, techniques for implementing a file change log in a distributed file system are desirable.

SUMMARY OF THE INVENTION

Various embodiments of methods and systems for implementing a file change log in a distributed file system are disclosed. In one embodiment, a method involves operating a distributed file system that presents a namespace and maintaining a file change log for the namespace. Operating the distributed file system involves executing an instance of a file system on each of several nodes. In some embodiments, maintaining the file change log involves maintaining a single file change log for the namespace. Updates to the single file change log can be handled by a primary node or controlled using a locking mechanism. In other embodiments, several private file change logs (e.g., one per node) are maintained, and these private file change logs are merged into a single file change log (e.g., by a primary node).

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
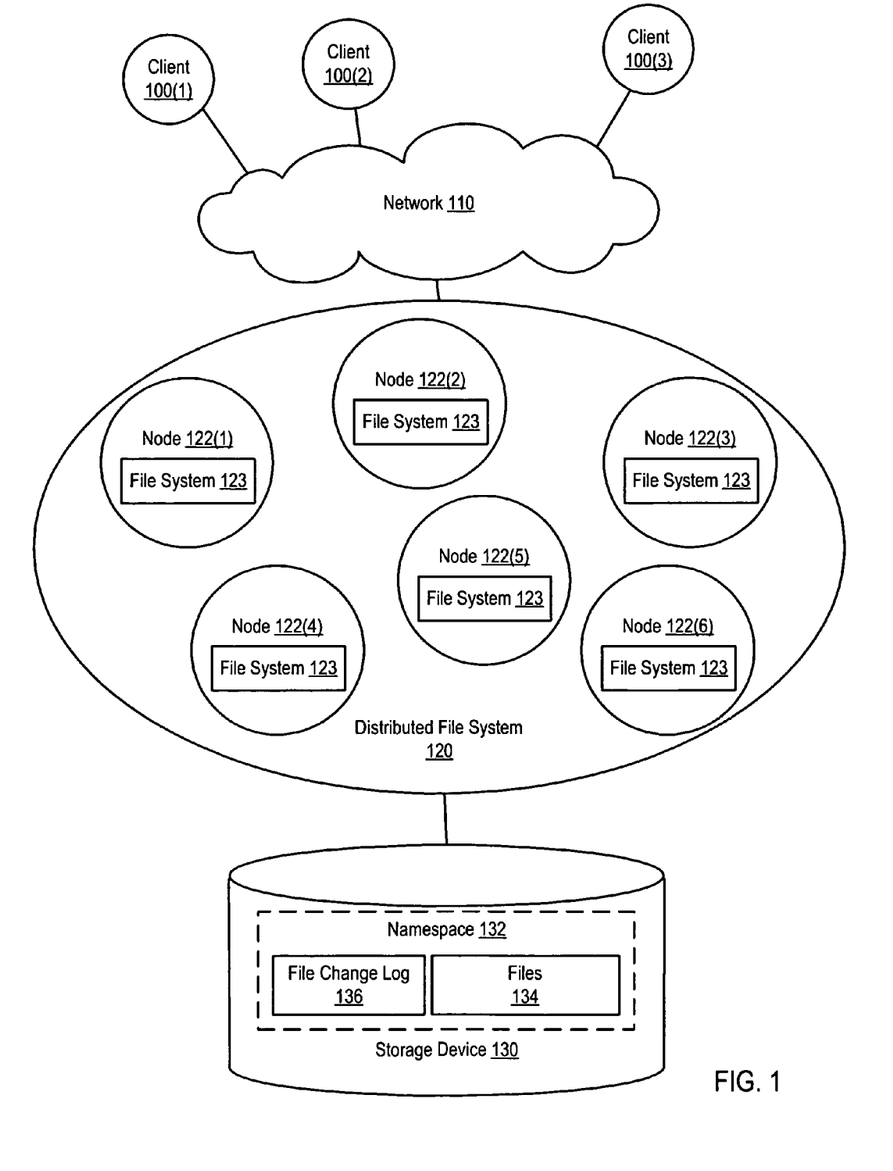
FIG. 1 is a block diagram of a distributed file system that maintains a file change log, according to one embodiment of the present invention.

FIG. 1 illustrates a system that includes a distributed file system. As shown, several clients 100(1)-100(3) are coupled by network 110 to a distributed file system 120. Distributed file system 120 includes several nodes 122(1)-122(6), each of which executes an instance of a file system 123.

Distributed file system 120 is coupled to one or more storage devices, such as a storage device 130. Nodes 122(1)-122(6) cooperate to present a unified namespace 132 for file system objects stored within the storage space provided by storage device 130. File system objects within namespace 132 can include one or more files 134 (e.g., application files used by applications executing on clients 100(1)-100(3)) as well as a specialized file referred to as a file change log 136.

Clients 100(1)-100(3) are each computing devices that access one or more file system objects within the namespace presented by distributed file system 120. Clients 100(1)-100(3) can include various computing devices such as personal computers, servers, cell phones, personal digital assistants, network appliances, and the like. Multiple clients can be implemented within the same computing device in some embodiments. It is noted that other embodiments can include fewer or additional clients than are shown in FIG. 1. Additionally, nodes within the distributed file system can also be clients of the distributed file system.

Network 110 can include one or more of various types of networks. Network 110 can include a local area network (LAN) or wide area network (WAN), such as the Internet, or a combination of one or more different types of networks. Various media can be used to implement network 110, including Ethernet links, wireless links, and the like.

Distributed file system 120 organizes data into files and/or directories (a directory is a special type of file). The particular set of one or more directories and/or files that distributed file system 120 organizes can also be referred to as a "file system." It is noted that a file system need not include any user files (e.g., when the file system is created, the file system may include only a single file, which defines the root directory of the file system). In one embodiment, distributed file system 120 is implemented by executing an application such as VERITAS Cluster File System (CFS) (available from VERITAS Software Corp. of Mountain View, Calif.) on each of nodes 122(1)-122(6).

Nodes 122(1)-122(6) are each computing devices. In some embodiments, each node is implemented in a separate physical computing device. In other embodiments, several nodes are implemented in a single physical computing device. For example, a multiprocessor computer system can be subdivided into several virtual machines, each of which is used to implement one of the nodes in a file server cluster. Nodes 122(1)-122(6) are coupled to communicate with each other. It is noted that a node within distributed file system 120 can implement both a client and an instance of a file system. Nodes 122(1)-122(6) are coupled to communicate with each other by one or more networks (not shown in FIG. 1). For example, nodes 122(1)-122(6) can be coupled by one or more private networks. Additionally, nodes 122(1)-122(6) can be coupled by one or more LANs and/or WANs. In some embodiments, distributed file system 120 is implemented as a cluster and one or more private network(s) are used to communicate cluster-specific messages, such as heartbeat messages and messages effecting cluster membership, among the nodes.

Namespace 132 is defined by a set or group of names that is managed according to some naming convention by distributed file system 120. Namespaces can vary among file systems. A flat namespace uses a single, unique name for every file system object. For example, a small Windows (NetBIOS) network requires a different name to be assigned to each computer and printer which appears as a file system object within a flat namespace. File system objects within the namespace can be accessed by applications (e.g., such as those executing on clients 100(1)-100(3)).

File change log 136 stores information identifying files within namespace 132 that have recently been accessed (e.g., written to or read from). In some embodiments, file change log 136 identifies files that have recently been modified. In other embodiments, file change log 136 identifies files that have recently been read from and/or written to. Distributed file system 120 updates file change log 136 to indicate that an access to a file has occurred.

File change log 136 can appear as a regular file (as opposed to a device, hidden, or system file) in namespace 132. In some embodiments, even though file change log 136 appears as a regular file, operations that can potentially modify file change log 136, such as write operations, are not allowed to be initiated by applications other than distributed file system 120. This protects file change log 136 from corruption that might otherwise result if, for example, an application or a user wrote to the file change log. In alternative embodiments, file change log 136 does not appear as a regular file within the name space. In such embodiments, file change log 136 can be accessed via a special interface provided by the file system.

Applications can determine whether a file has been changed by accessing the file change log 136, without needing to repeatedly scan the entire file system. For example, an application can initially scan the entire file system and, thereafter, use file change log 136 to identify changes. File change log 136 can be used by backup applications to identify the files within namespace 132 that have changed, and therefore need to be backed up, since the last backup. Web search engines and indexing services can use file change log 136 to determine which files have been changed, added or deleted and thus avoid rescanning the entire file system to refresh indexing databases. Data replication products can also use file change log 136 to identify files to synchronize on replicated nodes during system recovery.

In some embodiments, file change log 136 identifies files by Mode numbers. In an alternative embodiment, file change log 136 identifies files by filename and/or pathname, so that applications are not burdened with the task of maintaining their own copies of file system metadata, such as File Reference Numbers, in order to be able to use file change log 136.

Applications can read, open, close, and seek data in the file change log using file system-independent operating system functions. In some embodiments, file change log 136 can be read by multiple applications simultaneously, even when the file change log is being updated by distributed file system 120.

The types of changes to be tracked and logged by file change log 136 include selected changes to metadata, links to the file, and attributes of the file, as well as file creation, removal, and modification. While file change log 136 identifies files that have been modified, file change log 136 may not identify the nature of the modification and/or pre- and post-modification values of the file in some embodiments. In one embodiment, entries in file change log 136 include the following information: a change type, a next record type, an identifier for the file that was modified, a timestamp for the change, a generation count, and/or a file name length. If a file change log record has a value for the file name length, the file change log record is followed by one or more records containing the file name.

If file change log 136 already indicates that, within a prespecified time period, a file has been modified, an additional entry in the file change log 136 to record that the file has changed again during that period would be duplicative. In one embodiment, an administrator can classify operations into categories indicating how often (e.g., never, each time, or once per period) the occurrence of each operation should be identified in the file change log. For example, operations such as writes, appends, and truncations can be written to the file change log selectively (e.g., only once during a given time period). Subsequent writes, appends, and truncations can be performed without subsequent records being written to the file change log until the given time period elapses. In such a situation, write, append, and truncation operations can be classified as operations to be selectively logged.

Figure 2:
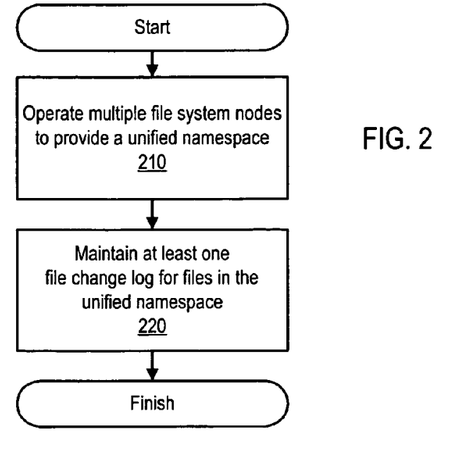
FIG. 2 is a flowchart of a method of maintaining a file change log in a distributed file system, according to one embodiment of the present invention.

FIG. 2 is a flowchart of a method of operating a distributed file system. At 210, multiple file system nodes operate cooperatively to provide a file system namespace. Thus, instead of each providing an independent namespace, each node contributes toward the maintenance of the same namespace. In order to provide a single file system namespace, the nodes share access to file system metadata in order to, for example, guarantee that names within the namespace are unique. In some embodiments, the nodes operate as a cluster.

At 220, at least one file change log is maintained for files within the unified namespace. As noted above, the file change log tracks changes to files within the namespace (the file change log can also track other types of access (e.g., reads) to a file, even if such types of access do not modify the file). The file change log can record changes initiated at each node of the distributed file system. In some embodiments, a single file change log is maintained for all of the nodes in the distributed file system. As described in more detail below, updates to the single file change log can be coordinated and ordered among the different nodes by associating a locking mechanism with the file change log or by restricting write access to the file change log to a single node.

In other embodiments, multiple file change logs (e.g., one per node) are maintained. In some of these embodiments, the distributed file system routinely updates an aggregate file change log based on multiple per-node file change logs, as described in more detail below. Applications can then access the aggregate file change log. In other embodiments, each node maintains its own file change log. Each node includes ordering information in each file change log entry, such that entries in different file change logs can be ordered relative to each other. Applications can read the per-node file change logs and use the ordering information to determine the relative order of the entries.

Figure 3:
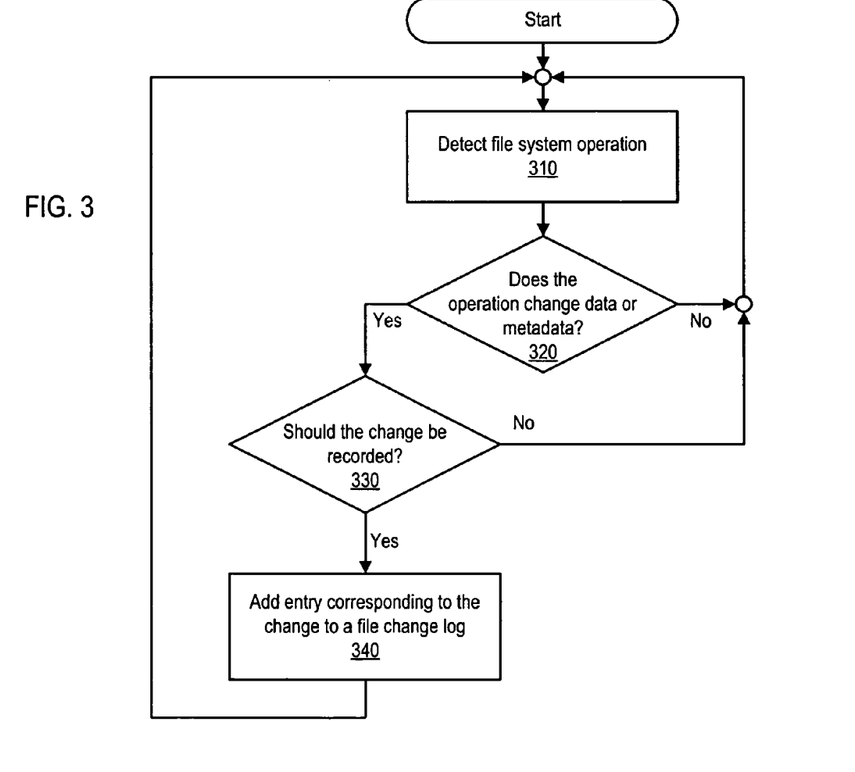
FIG. 3 is a flowchart of a method of updating a file change log, according to one embodiment of the present invention.

FIG. 3 is a flowchart illustrating how a file change log can be maintained for a namespace. At 310, a file system operation is detected. It is then determined whether the operation causes a change to file system data or metadata within the namespace, as shown at 320. As noted above, such changes can involve modifications caused by creating, removing, or modifying a file, as well as modifications caused by changing metadata associated with the file, links to the file, and attributes of the file. For example, when a file is read, metadata associated with that file is modified to identify the time at which the file was most recently accessed.

As described above, in some embodiments, an administrator can control how often an entry corresponding to a particular file can be added to the file change log. In such embodiments, if the administrator has specified that new entries for a given file can only be added once per period, and if the file change log already includes an entry corresponding to a particular file, no additional entry will be added to the file change log if that particular file is subsequently modified within that period. For example, the file change log may simply record whether or not a given file has been modified subsequent to a particular point in time. If an entry already exists for a file for a particular time period in such a file change log, there is no need to add additional entries for the file to the file change log each subsequent time the file is modified. Thus, in such embodiments, a determination (shown at 330) can be made as to whether the change should be recorded. If the change should be recorded (e.g., if the change modifies a file and the file change log does not already include an entry corresponding to that file for the current time period), an update to the file change log is initiated (e.g., either directly by initiating the update to the file change log or indirectly by generating a request that another node perform the update to the file change log). For example, an entry corresponding to the change can be added to the file change log, as shown at 340. Otherwise, the change is not recorded.

It is noted that in other embodiments, a file change log records additional information (e.g., time at which the modification to the file occurred and/or information indicative of the operation that was performed on the file). In such embodiments, multiple file change log entries per file can be allowed within the same time period.

Figure 4:
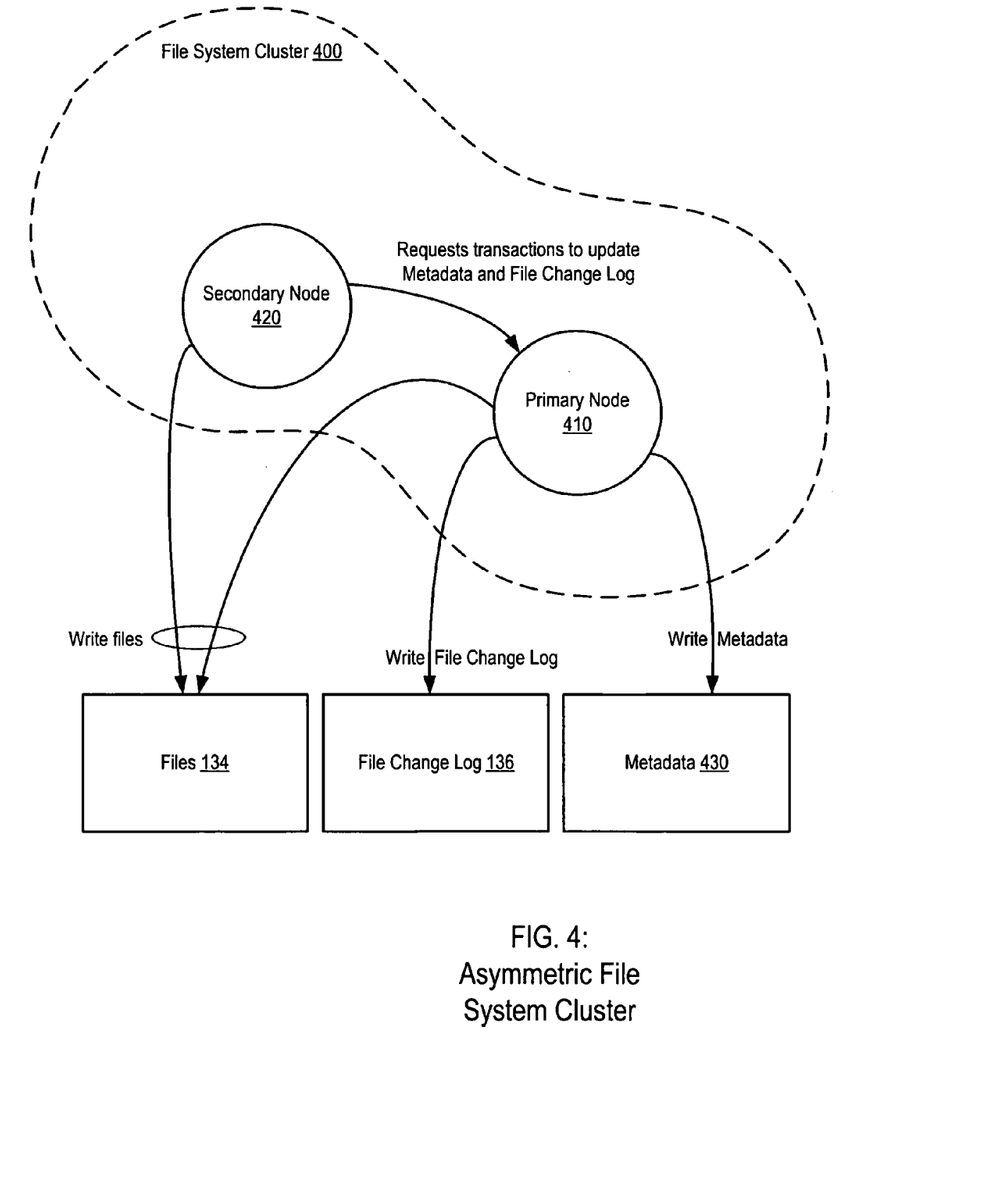
FIG. 4 is a block diagram of an asymmetric file system cluster, according to one embodiment of the present invention.

FIG. 4 is a block diagram of a distributed file system that is operated as an asymmetric file system cluster. As shown, a file system cluster 400 includes a primary node 410 and a secondary node 420. It is noted that file system clusters can have fewer or additional nodes in other embodiments. In general, an asymmetric file system cluster will have a single primary node and one or more secondary nodes.

Nodes 410 and 420 in file system cluster 400 operate to present a unified namespace that includes files 134 and file change log 136. File system cluster 400 uses metadata 430 to manage files such as files 134 and file change log 136.

File system cluster 400 is an asymmetric file system cluster in that only certain nodes can perform certain file system functions. For example, all nodes (primary and secondary) are able to read from and write to files within the namespace. However, only the primary node is allowed to modify metadata 430. Certain other activities (such as renaming, deleting, and creating files) can also be restricted to the primary node in some embodiments.

The arrows in FIG. 4 indicate which nodes can modify which types of data. As shown, both primary node 410 and secondary node 420 can write to files 134. However, only primary node 410 can modify file change log 136 and metadata 430. If secondary node 420 needs to update metadata 430, secondary node 420 sends a request to update metadata 430 to primary node 410. Primary node 410 then performs the requested transaction in order to update metadata 430.

Similarly, secondary node 420 is unable to directly modify file change log 136. Accordingly, if secondary node 420 performs an action (e.g., modifying one of files 134) that results in the potential need to update file change log 136, secondary node 420 will send a request to update file change log 136 to primary node 410. Primary node 410 can then determine whether file change log 136 needs to be updated and, if an update is needed, perform the appropriate modification to file change log 136. Alternatively, secondary node 420 can determine whether the update is needed prior to sending the request to primary node 410 (e.g., by reading from file change log 136). Situations in which an update will not be needed arise, for example, when the file change log is used to track whether a file has been modified in a given period of time. If the file change log already indicates that a given file has been modified during the time period at issue, it is not necessary to update file change log 136 in response to subsequent modifications to that file during that time period. Since primary node 410 handles all updates to file change log 136, primary node 410 is the ordering point at which updates to the file change log are ordered relative to each other.

It is noted that a single file system transaction (e.g., performed to create a new file) can involve several different actions. For example, a node can write to a file, send a request to a primary node to update metadata corresponding to the file, and send a request to the primary node to update the file change log for the file as part of a single atomic transaction. As part of that same transaction, the primary node updates the metadata and file change log in response to the node's requests.

Each time a secondary node such as secondary node 420 modifies a file (e.g., by writing to the file), the secondary node will perform the modification to the file locally (i.e., the secondary node will initiate the activity needed to modify the file). Additionally, the secondary node will send a request to update file change log 136 to primary node 410. The secondary node can send the request at various times relative to performing the modification to the file. For example, in some embodiments, the secondary node can send the request in response to completing the modification to the file. In other embodiments, the secondary node can send the request prior to completing the modification. It is noted that primary node 410 can also update file change log 136 in response to modifying metadata 430.

Figure 5:
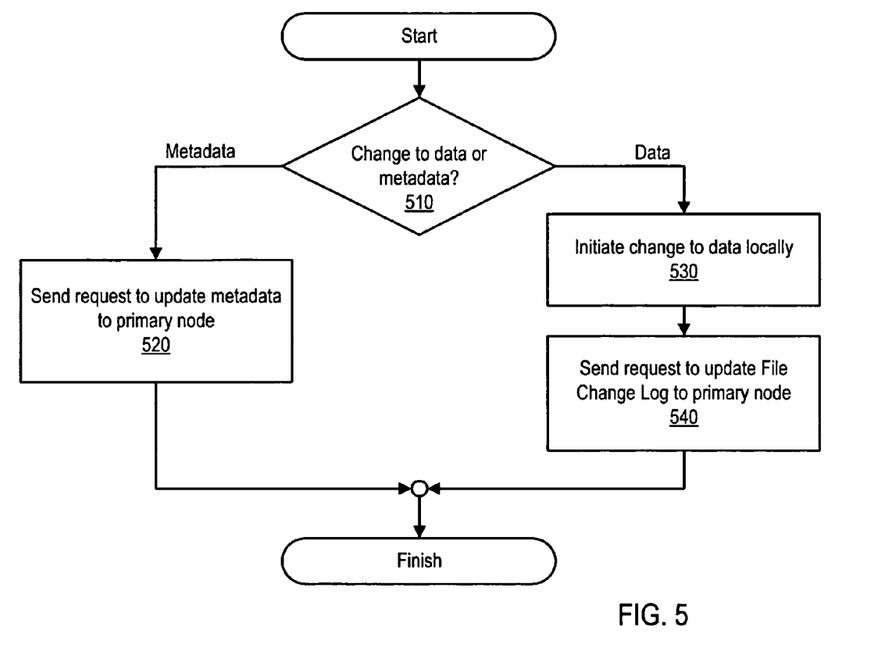
FIG. 5 is a flowchart of a method of handling modifications to file system data and metadata in an asymmetric file system, according to one embodiment of the present invention.

FIG. 5 illustrates a method of updating files and metadata in an asymmetric file system cluster. This method can be performed by a secondary node, such as secondary node 420 of FIG. 4, in an asymmetric file system cluster.

The secondary node detects a change to data or metadata at 510. Such changes can include any action that modifies a file and/or metadata, including writes to a file, renaming of a file, deletion or creation of a file, and the like. If the detected change modifies metadata, the secondary node sends a request to update the metadata to the primary node, as shown at 520. Since this is an asymmetric file system cluster, the secondary node cannot modify the metadata locally. In response to the request to update the metadata, the primary node will perform the requested update as well as update the file change log, if needed.

If the detected change modifies data, the secondary node performs the change locally, as indicated at 530. For example, if the detected change is a write to a file, the secondary node can initiate the write to the file locally. The secondary node also sends a request to update the file change log to the primary node, as indicated at 540. The method then finishes. It is noted that functions 510-540 can repeat throughout the operation of the secondary node. It is also noted that the method can include other functions (e.g., such as determining whether a particular change should be recorded in the file change log, as described above with respect to function 330 of FIG. 3) in addition to and/or instead of those functions shown in FIG. 5.

Figure 6:
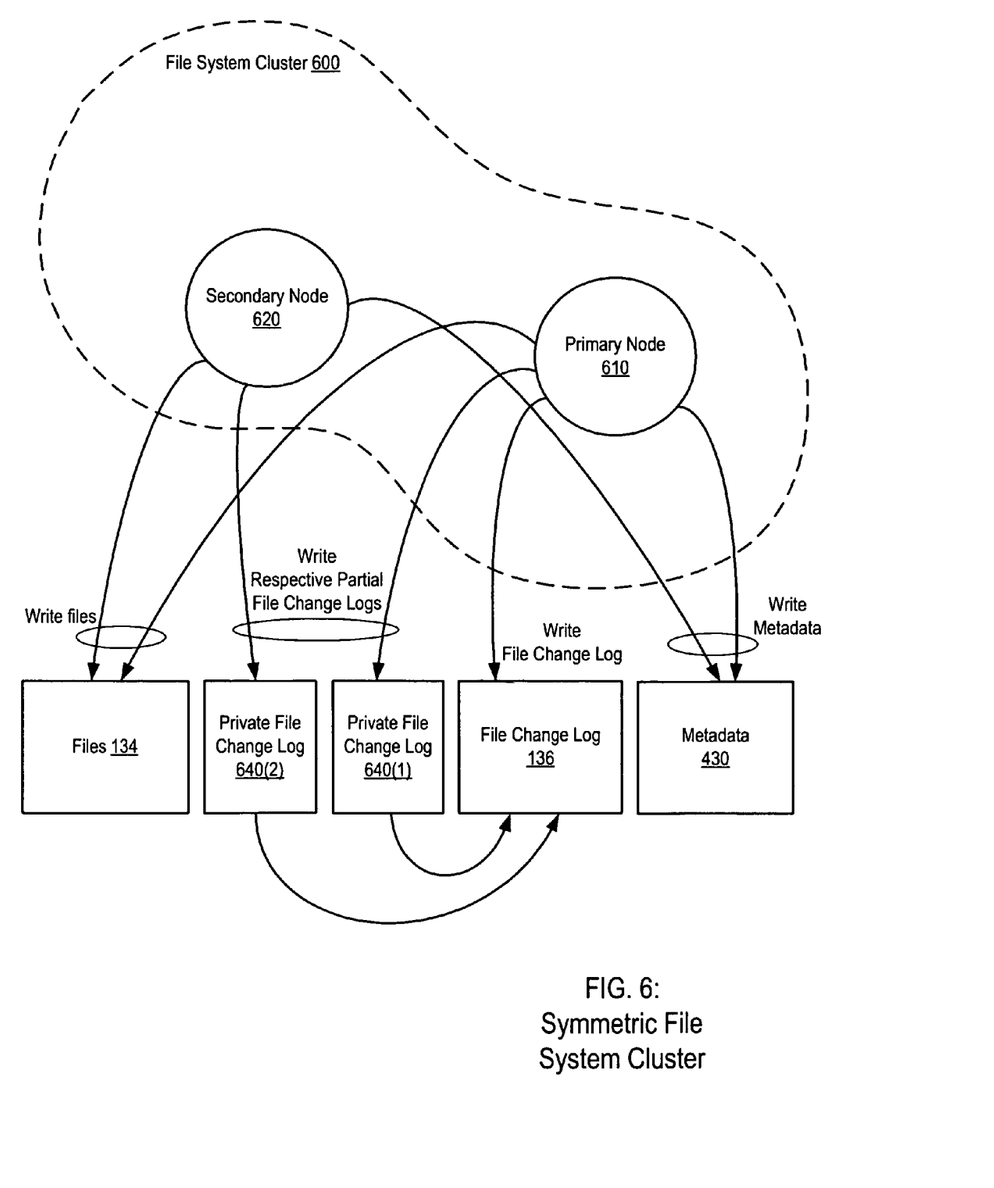
FIG. 6 is a block diagram of a symmetric file system cluster, according to one embodiment of the present invention.

FIG. 6 illustrates a block diagram of a symmetric file system cluster. As shown, a symmetric file system cluster 600 includes two nodes, a primary node 610 and a secondary node 620. It is noted that other embodiments can include fewer or additional nodes. Additionally, some embodiments of a symmetric file system cluster may not differentiate between primary and secondary nodes.

File system cluster 600 operates on several different types of data and metadata, including files 134, file change log 136, and metadata 430, as well as two private file change logs 640(1) and 640(2). In general, each node will have a private file change log (the private file change logs can also be referred to as per-node file change logs). Like file change log 136, private file change logs 640(1) and 640(2) can appear as regular files that are visible in the name space. However, in some embodiments, private file change logs 640(1) and 640(2) are instead maintained as non-regular files (e.g., device or hidden files).

File system cluster 600 is symmetric in that all nodes in the cluster, both primary and secondary (if such distinctions are maintained) can initiate updates to both data and metadata locally. Thus, unlike secondary node 420 in asymmetric cluster 400 of FIG. 4, secondary node 620 can initiate changes to metadata 430 locally.

As shown by the arrows, both primary node 610 and secondary node 620 can modify files 134 and metadata 430. Additionally, each node can modify a private file change log. Thus, primary node 610 can modify private file change log 640(1). Secondary node 620 can similarly modify private file change log 640(2). In this embodiment, only primary node 610 can modify file change log 136, however.

File change log 136 is the file change log that is used by other applications (e.g., backup and replication applications) to determine which files have been modified during a given interval. Private file change logs 640(1) and 640(2) (collectively referred as file change logs 640) are not used by external applications. Instead, these private file change logs are used by the distributed file system to track changes on a per-node basis. Primary node 610 (and/or other one or more other nodes within symmetric file system cluster 600) merges the information contained in the private file change logs into file change log 136, so that file change log 136 reflects the changes that have been initiated throughout the cluster.

Private file change logs 640 can be merged into file change log 136 in response to a variety of different stimuli. For example, primary node 610 can be configured to merge the private file change logs into file change log 136 periodically. Additionally, any time an application attempts to read file change log 136, primary node (or the node handling the read request) stalls the read until the private file change logs have been merged into file change log 136. Merging can also be triggered in response to one or more private file change logs reaching a certain size and/or containing information corresponding to a certain number of modifications.

When private file change logs 640 are merged into file change log 136, file change log 136 is updated so that file change log 136 is consistent with the changes recorded in each of the private file change logs. For example, if private file change log 640(1) indicates that File A has been modified and if private file change log 640(2) indicates that File B has been modified prior to being merged, file change log 136 should indicate that Files A and B have been modified subsequent to the merger. In one embodiment, private file change logs 640 can be updated (e.g., by removing or clearing all entries that are captured in the merger) subsequent to being merged into file change log 136.

In order to be able to order changes in different private file change logs relative to each other, each node within symmetric file system cluster 600 includes some sort of ordering information in each private file change log entry. For example, in one embodiment, an inode version number is included in each private file change log entry. The inode version number is a number that reflects the current version of a particular inode. The inode version number is updated each time that the inode and/or the file associated with the inode is modified. Whenever a node adds an entry to a private file change log to reflect a change to a file, the node includes the inode version number of the inode associated with the file in the new entry. It is noted that some file systems use other structures to maintain metadata instead of inodes. In embodiments that employ those file systems, the version numbers correspond to those structures instead of inodes. If multiple files are affected by a single transaction, the inodes and inode version numbers of each file involved in the transaction will be recorded in the private file change log.

In one embodiment, a lock will be associated with each private file change log. When a node updates its associated private file change log, the node will acquire the associated lock in shared mode (when a node holds a lock in shared mode, other nodes can still read the private file change log associated with the lock; however, the other nodes cannot modify the private file change log). Once the shared lock is acquired, the node can add entries to the private file change log. In one embodiment, each node adds entries to an "in-core" version of all or part of the private file change log (the in-core version is maintained in local memory within and/or coupled to the node). The in-core version maintained by a particular node tracks the changes initiated by that particular node. When the lock is revoked, the in-core version is flushed to persistent storage.

When the private file change logs are merged, the node performing the merger acquires the lock for each file change log in exclusive mode (when a node holds a lock in exclusive node, other nodes cannot access the private file change log associated with the lock). The node then reads each private file change log in order to identify the current last valid offset in each private file change log. Once the last valid offset for each private file change log is obtained, the node releases the lock, allowing the other nodes to resume adding entries to their respective private file change logs. The node then reads each of the private file change logs up to the corresponding last valid offset. For each inode that is identified in an entry of one (or more) of the private file change logs, the node creates a sorted list of private file change log entries, such that the entries identifying that Mode from all of the private file change logs are sorted based on the Mode version number included in each entry. The sorted list for each Mode can then be used to update file change log 136.

The above example describes using Mode version numbers to provide an ordering mechanism for entries in different private file change logs. It is noted that other embodiments can use other ordering mechanisms. For example, in some embodiments, each node can obtain a value from a single monotonically increasing cluster wide counter or logical clock (e.g., a Lamport clock) for inclusion in each new private file change log entry. When the private file change logs are merged into file change log 136, the node performing the merger can sort private file change log entries based on the ordering information (e.g., Mode version number, counter value, logical clock value, or the like) included in each private file change log entry. In some embodiments, such ordering information is included in private file change log entries but is not included in entries in file change log 136.

In other embodiments, each node can include a clock that is synchronized with each clock in each other node in symmetric file system cluster 600. For example, the nodes can each use a protocol such as NTP (Network Time Protocol) for clock synchronization. Each node can then use its clock to generate timestamps for private file change log entries. When a merger is performed, the node performing the merger sorts private file change log entries based on the timestamp included in each private file change log entry. Thus, such timestamps can also be used as ordering information. It is noted that the timestamps may not be included in the corresponding entries in file change log 136.

In still other embodiments, a symmetric file system cluster does not maintain private file change logs. Instead, each node adds entries directly to file change log 136. In such an embodiment, however, before a node can add an entry to file change log 136, the node obtains a lock associated with file change log 136. While the lock is held by a node, other nodes will be unable to modify file change log 136. Accordingly, the lock provides an ordering point for entries in file change log 136.

Figure 7:
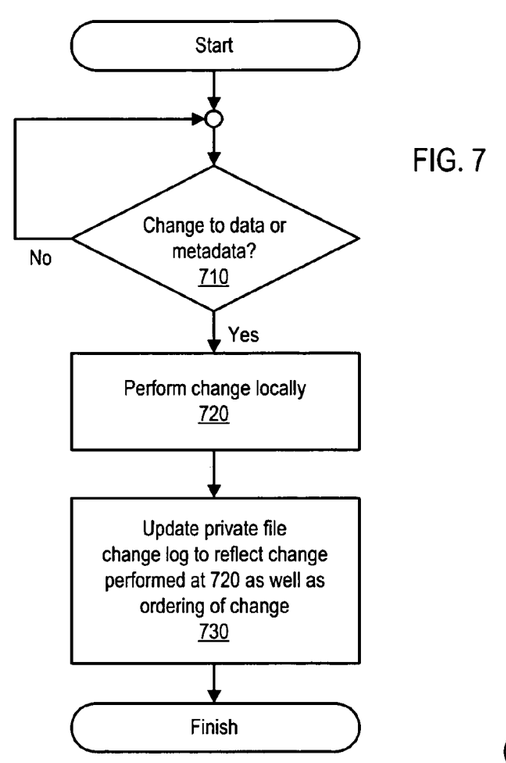
FIG. 7 is a flowchart of a method of updating a private file change log, according to one embodiment of the present invention.

FIG. 7 is a flowchart of a method performed by a node that maintains a private file change log. This method can be performed by a node within a symmetric file system cluster. At 710, various changes to data and/or metadata are detected (e.g., as described with respect to functions 310 and 510 in FIGS. 3 and 5 respectively). If a change to data and/or metadata is detected at 710, the node initiates the change locally, as shown at 720, and also updates a private file change log, if needed, to reflect the change, as shown at 730. It is noted that the method of FIG. 7 can include other functions (e.g., such as determining whether a particular change should be recorded in the file change log, as described above with respect to function 330 of FIG. 3) in addition to and/or instead of those functions shown in FIG. 7.

Figure 8:
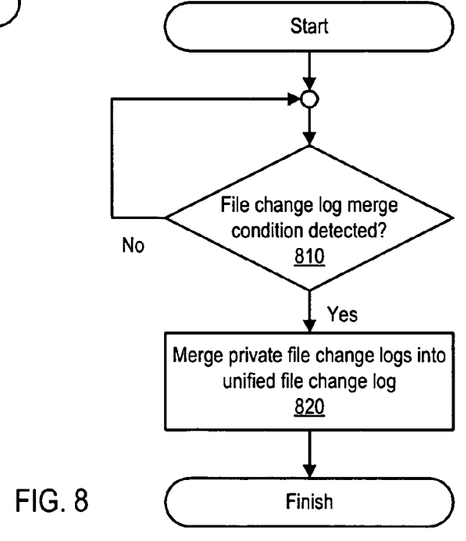
FIG. 8 is a flowchart of a method of merging several private file change logs into a unified file change log, according to one embodiment of the present invention.

FIG. 8 illustrates a method of merging several private file change logs. This method can be performed by a node within a symmetric file system cluster. This method can also be performed by an external application. At 810, a file change log merge condition can be detected. As noted above, detecting such a condition can involve detecting that an application is attempting to read from a unified file change log, which should be consistent with all of the private file change logs, as well as detecting that one or more private file change logs have reached a threshold number of entries. Additionally, such a condition can be detected periodically. If the method is being performed by an external application, the file change log merge condition can be detected whenever the external application needs to access information in the unified file change log.

If a file change log merge condition is detected at 810, the private file change logs are merged into a unified file change log, as shown at 820. As noted above, performing the merger can involve using ordering information in each private file change log entry to order entries in different private file change logs relative to each other. For example, such ordering information can include inode version numbers, counter values, Lamport clock values, and timestamps.

Figure 9:
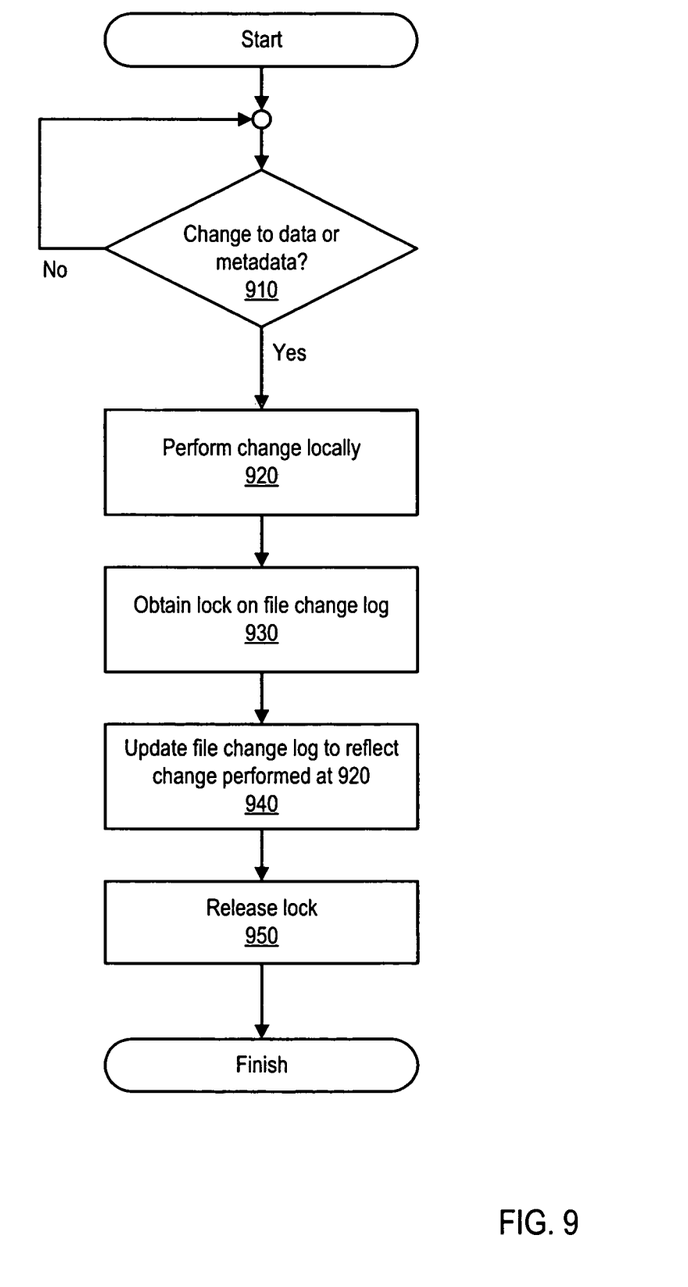
FIG. 9 is a flowchart of another embodiment of a method of maintaining a file change log in a symmetric file system cluster, according to one embodiment of the present invention.

FIG. 9 illustrates another method for maintaining a file change log. This method can be performed by a node in the symmetric file system cluster of FIG. 6. In this example, instead of maintaining private file change logs on a per-node basis, a single file change log is maintained. Access to the file change log is controlled by a locking mechanism, such that only one node can modify the file change log at a time. In one embodiment, a locking mechanism is implemented using a storage location that is accessible to all nodes within the cluster. A node can acquire the lock by writing a particular value (e.g., the node's ID) to the storage location. When a node releases the lock, the node can write a value, which indicates that no node currently holds the lock, to the storage location. If another node has already acquired the lock (e.g., as indicated by another node's ID being stored in the storage location) when the node attempts to acquire the lock, the node can periodically read the storage location to see if the other node has released the lock. It is noted that in alternative embodiments, a cluster-wide lock manager service (e.g., such as the VERITAS Global Lock Manager (GLM) provided by VERITAS Software Corporation of Mountain View, Calif.) can be used to control nodes' access to the file change log instead of the locking mechanism described above.

At 910, a change to data or metadata is detected (e.g., similarly to functions 310 of FIG. 3, 510 of FIG. 5, and 710 of FIG. 7). If a change to data or metadata is detected, the change is initiated locally, as shown at 920. Additionally, the node obtains a lock on the file change log, as shown at 930. Once the lock is obtained, at 940 the node updates the file change log to reflect the change initiated at 920. Once the file change log has been updated, the lock associated with the file change log is released. It is noted that if an update to the file change log is not needed for the change initiated at 920 (e.g., because the file change log already identifies the file as having been modified within the current time period), functions 930 and 940 are not performed.

While FIGS. 4-9 have illustrated specific embodiments, it is noted that other embodiments can be implemented differently. For example, the techniques used to control access to the file change log in an asymmetric file system cluster (e.g., as illustrated in FIGS. 4-5) can also be implemented in a symmetric file system cluster and/or other types of distributed file systems. Similar, the techniques used to control access to the file change log in a symmetric file system cluster (e.g., as illustrated in FIGS. 6-9) can be adapted to operate in an asymmetric file system cluster or other type of distributed file system.

Figure 10:
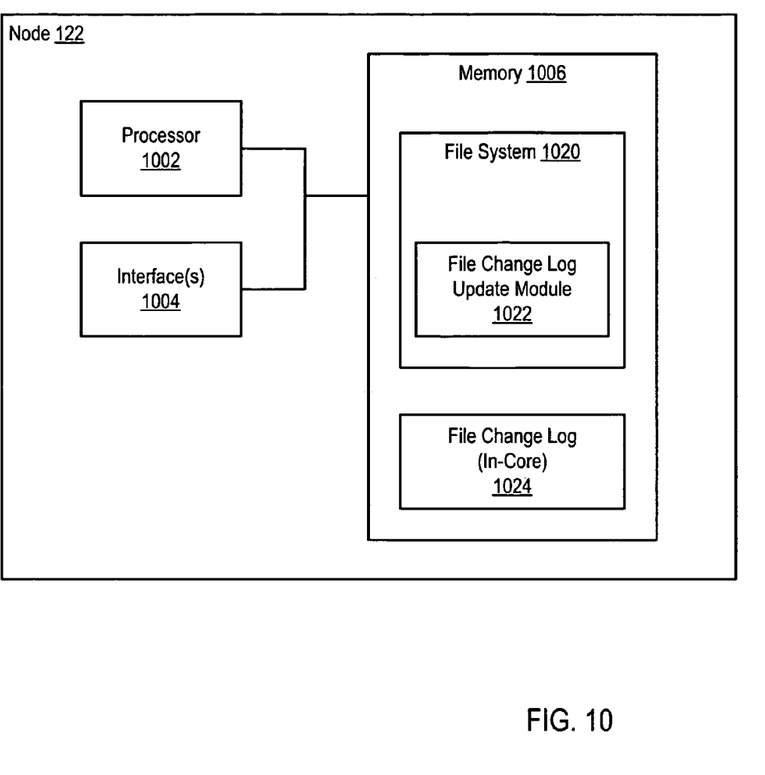
FIG. 10 is a block diagram of a node within a distributed file system cluster, according to one embodiment of the present invention.

FIG. 10 illustrates a block diagram of a computing device that can be used to implement a node 122 (e.g., one of nodes 122(1)-122(6) of FIG. 1) in a distributed file system. As illustrated, node 122 includes one or more processors 1002 (e.g., microprocessors, PLDs (Programmable Logic Devices), or ASICs (Application Specific Integrated Circuits)) configured to execute program instructions stored in memory 1006. Memory 1006 can include various types of RAM (Random Access Memory), ROM (Read Only Memory), Flash memory, MEMS (Micro Electro-Mechanical Systems) memory, and the like. Node 122 also includes one or more interfaces 1004. Processor 1002, interface 1004, and memory 1006 are coupled to send and receive data and control signals by a bus or other interconnect.

Interface(s) 1004 can include network interfaces to various networks and/or interfaces to various peripheral buses. Interface(s) 1004 can include an interface to one or more storage devices on which various files (e.g., user files as well as a file change log, as shown in FIG. 1) are stored. Interface(s) 1004 can also include an interface to a network, for use in communicating with other nodes and/or for use in communicating with networked storage devices. For example, interface(s) 1004 can be used to communicate heartbeat messages with other nodes in embodiments in which the nodes operate as a cluster.

In this example, program instructions executable to implement an instance of a file system 1020, are stored in memory 1006. As shown, file system 1020 includes a file change log update module 1022. File change log update module 1022 can update a file change log, which tracks changes to files in a namespace that is provided by a distributed file system. File change log update module 1022 can update the file change log in various ways, including using one or more of the methods shown in FIGS. 3, 5, 7, 8, and 9. The techniques used to update the file change log can vary depending on how access to the file change log is controlled, whether each node maintains a private file change log, and/or whether node 122 is a primary or secondary node. An in-core copy 1024 of all or part of a file change log can also be stored in memory 1006.

The program instructions and data implementing file system 1020 can be stored on various computer readable media such as memory 1006. In some embodiments, file system software is stored on a computer readable medium such as a CD (Compact Disc), DVD (Digital Versatile Disc), hard disk, optical disk, tape device, floppy disk, and the like). In order to be executed by processor 1002, the instructions and data implementing file system 1020 are loaded into memory 1006 from the other computer readable medium. The instructions and/or data implementing file system 1020 can also be transferred to node 122 for storage in memory 1006 via a network such as the Internet or upon a carrier medium. In some embodiments, a computer readable medium is a carrier medium such as a network and/or a wireless link upon which signals such as electrical, electromagnetic, or digital signals, on which the data and instructions implementing file system 1020 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    operating a distributed file system, wherein
        the distributed file system is configured to present a plurality of files within a namespace to a client, and
        the operating comprises executing an instance of a file system on each of a plurality of nodes; and
    maintaining a file change log for the namespace, wherein
        the file change log stores information identifying each file within the namespace that has been modified within a selected period,
        the file change log temporally orders a first change initiated at a first node of the plurality of nodes before or after a second change initiated at a second node of the plurality of nodes, wherein the first change and the second change modify one or more existing files within the namespace, and
        the distributed file system is configured to provide access to the file change log to an application executed by the client.

2. The method of claim 1, wherein
    the maintaining comprises the distributed file system maintaining a single file change log for the namespace.

3. The method of claim 2, further comprising:
    sending a request from a first node of the nodes to a primary node of the nodes, in response to the first node accessing a file within the name space, wherein
        the request indicates that the primary node should update the single file change log.

4. The method of claim 3, further comprising:
    operating the nodes as an asymmetric file system cluster.

5. The method of claim 2, further comprising:
    a first node of the nodes acquiring a lock on the file change log, prior to updating the file change log.

6. The method of claim 2, wherein the information stored by the file change log includes at least one of: a change type, a next record type, an identifier for the modified file, a timestamp for the change, a generation count, and a file name length.

7. The method of claim 1, wherein
    the maintaining comprises maintaining a plurality of private file change logs for the namespace, and
    each of the private file change logs is maintained by a respective one of the nodes.

8. The method of claim 7, further comprising:
    combining the private file change logs into a single file change log, wherein
        the combining is performed by a single node of the nodes.

9. The method of claim 8, wherein
the combining comprises sorting a plurality of file change log entries based on ordering information included in each of the file change log entries.

10. The method of claim 8, further comprising:
operating the nodes as a symmetric file system cluster.

11. A method comprising:
operating a node of a plurality of nodes, wherein
the node operates in conjunction with one or more other nodes of the plurality of nodes to present a plurality of files within a file system namespace to a client; and
initiating an update to a file change log, wherein
the update records an access initiated at the node to a file within the file change log,
the file is one of the plurality of files within the file system namespace,
the file change log stores information identifying each file within the file system namespace that has been modified within a selected period,
the file change log temporally orders the access before or after a second access initiated at a second node of the plurality of nodes, wherein the first change and the second change modify one or more existing files within the namespace, and
the plurality of nodes is configured to provide access to the file change log to an application executed by the client.

12. The method of claim 11, wherein the initiating the update to the file change log comprises:
sending a request from the node to a primary node, in response to the node accessing the file, wherein
the request indicates that the primary node should update the file change log.

13. The method of claim 11, wherein the initiating the update to the file change log comprises:
updating the file change log in response to the node accessing the file.

14. The method of claim 13, further comprising:
acquiring a lock on the file change log, prior to the updating to the file change log.

15. The method of claim 11, further comprising:
combining a plurality of private file change logs into the file change log, wherein each of the private file change logs is maintained by a respective one of the plurality of nodes.

16. The method of claim 15, wherein the combining the private file change logs into the file change log comprises:
sorting a plurality of file change log entries based on ordering information included in each of the file change log entries.

17. A non-transitory computer readable medium comprising program instructions executable to:
implement a file system on a node of a plurality of nodes, wherein
the node operates in conjunction with one or more other nodes of the plurality of nodes to implement a distributed file system that presents a plurality of files within a file system namespace to a client; and
initiate an update to a file change log, wherein
performance of the update records a change initiated at the node to a file within the file change log,
the file is one of the plurality of files within the file system namespace,
the file change log stores information identifying each file within the file system namespace that has been modified within a selected period,
the file change log temporally orders the change before or after a second change initiated at a second node of the plurality of nodes, wherein the first change and the second change modify one or more existing files within the namespace, and
the distributed file system is configured to provide access to the file change log to an application executed by the client.

18. The non-transitory computer readable medium of claim 17, wherein the program instructions are executable to initiate the update to the file change log by:
sending a request from the node to a primary node, in response to the node accessing the file, wherein the request indicates that the primary node should update the file change log.

19. The non-transitory computer readable medium of claim 17, wherein the program instructions are executable to initiate the update to the file change log by:
updating the file change log in response to the node accessing the file.

20. The non-transitory computer readable medium of claim 17, wherein the program instructions are executable to:
combine a plurality of private file change logs into the file change log, wherein each of the private file change logs is maintained by a respective one of the plurality of nodes.

21. A system comprising:
means for implementing a file system on a node of a plurality of nodes, wherein
the node operates in conjunction with one or more other nodes of the plurality of nodes to implement a distributed file system that presents a plurality of files within a file system namespace to a client; and
means for initiating an update to a file change log, wherein
performance of the update records a change initiated at the node to a file within the file change log,
the file is one of the plurality of files within the file system namespace,
the file change log stores information identifying each file within the file system namespace that has been modified within a selected period,
the file change log temporally orders the change before or after a second change initiated at a second node of the plurality of nodes, wherein the first change and the second change modify one or more existing files within the namespace, and
the distributed file system is configured to provide access to the file change log to an application executed by the client.

22. The system of claim 21, wherein the means for initiating the update to the file change log comprise:
means for sending a request from the node to a primary node, in response to the node accessing the file, wherein the request indicates that the primary node should update the file change log.

23. The system of claim 21, wherein the means for initiating the update to the file change log comprise:
means for updating the file change log in response to the node accessing the file.

24. The system of claim 21, further comprising:
means for combining a plurality of private file change logs into the file change log, wherein each of the private file change logs is maintained by a respective one of the plurality of nodes.

25. A node comprising:
a processor; and
a memory coupled to the processor, wherein the memory stores program instructions executable to:
implement a file system, wherein
the node operates in conjunction with one or more other nodes of a plurality of nodes to implement a distributed file system that presents a plurality of files within a file system namespace to a client; and
initiate an update to a file change log, wherein
performance of the update records a change initiated at the node to a file within the file change log,
the file is one of the plurality of files within the file system namespace,
the file change log stores information identifying each file within the file system namespace that has been modified within a selected period,
the file change log temporally orders the change before or after a second change initiated at a second node of the plurality of nodes, wherein the first change and the second change modify one or more existing files within the namespace, and
the distributed file system is configured to provide access to the file change log to an application executed by the client.

26. The node of claim 25, wherein the program instructions are executable to initiate the update to the file change log by:
sending a request from the node to a primary node, in response to the node accessing the file, wherein
the request indicates that the primary node should update the file change log.

27. The node of claim 25, wherein the program instructions are executable to initiate the update to the file change log by:
updating the file change log in response to the node accessing the file.

28. The node of claim 25, wherein the program instructions are executable to:
combine a plurality of private file change logs into the file change log, wherein each of the private file change logs is maintained by a respective one of the plurality of nodes.

* * * * *